United States Patent
Lasson et al.

[11] Patent Number: 6,036,803
[45] Date of Patent: Mar. 14, 2000

[54] METHOD OF PRODUCING PACKAGING MATERIAL IN THE FORM OF A WEB

[75] Inventors: Rolf Lasson, Rudeboksvägen; Peter Öhman, Järnåkravägen, both of Sweden

[73] Assignee: Tetra Laval Holdings & Finance S.A., Switzerland

[21] Appl. No.: 08/036,272

[22] Filed: Mar. 24, 1993

[30] Foreign Application Priority Data

Apr. 2, 1992 [SE] Sweden .................................. 9201033

[51] Int. Cl.[7] ........................... B32B 31/06; B32B 31/12; B32B 31/18
[52] U.S. Cl. ............... 156/216; 156/244.11; 156/244.18; 156/252; 156/259; 156/270
[58] Field of Search ........................ 156/244.11, 244.18, 156/250, 257, 259, 216, 252, 270, 271

[56] References Cited

U.S. PATENT DOCUMENTS

| | | |
|---|---|---|
| 3,477,126 | 11/1969 | Price .................... 156/244.18 X |
| 4,256,791 | 3/1981 | Holmerström et al. . |
| 4,266,933 | 5/1981 | Olsen . |
| 4,312,450 | 1/1982 | Reil . |
| 4,461,667 | 7/1984 | Pupp . |
| 4,595,116 | 6/1986 | Carlsson . |
| 4,657,614 | 4/1987 | Andersson . |
| 4,707,207 | 11/1987 | Baus ................... 156/244.18 X |
| 4,715,528 | 12/1987 | Kjelgaard et al. . |
| 4,815,655 | 3/1989 | Jacobsson et al. . |
| 4,819,839 | 4/1989 | Carlsson et al. . |
| 4,994,310 | 2/1991 | Fisk et al. . |
| 5,067,614 | 11/1991 | Jönsson . |
| 5,122,410 | 6/1992 | Löfgren et al. . |

FOREIGN PATENT DOCUMENTS

| | | |
|---|---|---|
| 2 337 560 | 2/1974 | Germany . |
| 35 33 940 | 1/1987 | Germany . |
| 38 38 739 | 5/1990 | Germany . |

*Primary Examiner*—Curtis Mayes
*Attorney, Agent, or Firm*—Burns, Doane, Swecker & Mathis, L.L.P.

[57] ABSTRACT

The disclosure relates to a method of producing packaging material comprising a core layer (9) which is provided with punched holes, apertures or slits (14), and which displays, along its one side, an unbroken layer (7) of a laminate consisting of aluminium foil and polyethylene. On production of the packaging material, a "primary laminate" (7) of polyethylene and aluminium foil is first created in that the polyethylene is extruded as a film between the aluminium foil and the surface of a cooling roller while, in a second operation, which is carried out on the same cooling roller, a web (9) of paper or board provided with holes, apertures or slits (14) is united with the above-mentioned primary laminate (7) by the intermediary of an extruded polyethylene layer (16).

14 Claims, 2 Drawing Sheets

METHOD OF PRODUCING PACKAGING MATERIAL IN THE FORM OF A WEB

TECHNICAL FIELD

The present invention relates to a method of producing packaging material in the form of a web, and of the type which comprises a core layer of paper or board, the core layer displaying punched-out holes, apertures or slits intended to be covered with layers of aluminium foil and thermoplastic adhering to the core layer.

BACKGROUND ART

Packaging containers or cartons of the single-use disposable type are often produced from a packaging material of the above-disclosed type. The packaging material is most generally provided in the form of webs rolled onto magazine reels and which, after unreeling from their magazine reels are reformed by folding into packaging containers or cartons. A package of this type which is common in the market place is that which is marketed under the trademark Tetra Brik®, and which is primarily employed for liquid contents such as milk, fruit juice etc. This package is produced in automatic packaging and filling machines in such a manner that the web unreeled from the magazine reel is reformed into a tube in that the edges of the web are united in an overlap joint or seam, whereafter the thus formed tube is filled with the intended contents and divided into individual packages with the aid of repeated transverse seals disposed in spaced apart relationship and at right angles to the tube. Once the supplied contents have been enclosed by such means in sealed parts of the tube, these are separated from the tube by cutting through the above-mentioned transverse seal zones. The separated tube parts are thereafter formed by folding along crease lines provided in the packaging material into parallelepipedic packages.

Packages of this type are often provided with opening arrangements in the form of holes, apertures or slits made in the packaging material and covered with tear-off strips, so-called "pull-tabs", and when the contents consist of a sterile product such as, for instance, sterilized milk or of an acidic product such as, for example, orange juice, the package is often manufactured from a packaging laminate including an aluminium foil layer which renders the package extremely tight against penetration by gases such as, for example, oxygen gas. In order to achieve the desired tightness, it is of crucial importance that the aluminium foil layer is not ruptured or damaged when the package is formed or on manufacture of the packaging material and, for the function of the pull-tab opening, it is vital that the aluminium foil layer possess extremely good adhesion in the region about the opening hole or aperture over which the tear-off strips are intended to be applied in a manner which will be described in greater detail hereinbelow.

A further object of the present invention is to treat and prepare, in a simple and efficient manner, a packaging material web of the above-mentioned type in such a way that the edge of the packaging material web is efficiently sealed-off with a plastic film disposed over or about the edge zone. It is known to seal-off liquid-absorbing material edges exposed to the inside of a packaging container with thermoplastic strips which bridge over or are folded around the edges. For the same purpose, it is also known in the art to provide the packaging material web with a so-called fixed edge strip of plastic, i.e. with a plastic strip which projects out from the rear edge of a board web and which can be folded around the edge and sealed against the opposing side. Such a "fixed edge strip" is obtained by disposing board webs in side-by-side relationship so that they form therebetween a slit or a gap, whereafter the webs and the slits are jointly covered over with a plastic foil or, in certain cases, with a plastic foil and an aluminium foil, whereafter the covered webs are separated by means of an incision in the slit zone, for forming a projecting, fixed strip. One inconvenience in this context has hitherto been that it has not proved possible to achieve adhesion (or in any event very poor adhesion) between, for example, an aluminium foil layer and a plastic layer in the region of the slits themselves, since these material webs cannot be compressed together within the slit zone because there is no backing support. Employing the method according to the present invention, it will, however, be possible to obviate this drawback by first producing a plastic-aluminium foil laminate in which the components in the laminate possess good adhesion to one another, and then laminate this plastic-aluminium foil laminate to the above-mentioned webs of core layer material, i.e. board, disposed side by side.

Packaging material of the type contemplated here can be produced using prior art technology by applying, in a plurality of separate lamination operations, the different layers, i.e. the aluminium foil layer, the inner plastic layer and so on, to the core layer of paper or board, and such a lamination process functions excellently in those cases when the core layer is not provided with holes, apertures or slits, i.e. regions where the coating layers extend over or beyond edge zones of the core layer. It has proved that, on coating of an aluminium foil against a core layer web of paper or board where the core layer is provided with holes, apertures or slits, difficulties occur in that the aluminium foil must, in connection with the lamination where the cohesive laminating layer most generally consists of a thin extruded thermoplastic film, be forced against the core layer substrate with the aid of a nip roller or soft pressure roller in order to achieve sufficient adhesion between the aluminium foil layer and the core layer. Since, as a rule, the aluminium foil layer is extremely thin (of the order of 5–10 μ meter), it will be forced by the nip roller against the edges around the apertures or slits in the core layer and partly pressed into these holes or apertures. Since the punched holes have a relatively sharp edge, there is a risk that the aluminium foil be ruptured and, at any rate, there is the risk that the aluminium foil will fold itself around the edges of the apertures or slits and will thereby either be weakened or suffer from inferior adhesion between the aluminium foil and the core layer precisely in the edge zones of the holes or apertures. Furthermore, adhesion between the plastic layer and the aluminium foil layer will be poor in the region of these holes or slits, since the pressure of the nip roller in these regions is limited.

The above-outlined circumstances have constituted a major problem which has, first, caused ruptures in the aluminium foil layer (and thereby insufficient gas tightness of the resultant packages), secondly, defective opening function because of poor adhesion between the aluminium foil layer and the core layer in the edge zones about the apertures, and thirdly poor adhesion between the aluminium foil layer and the plastic layer along those parts where the aluminium foil layer and the plastic layer project out beyond the core layer and, hence, are not supported by the core layer.

The above-considered drawbacks are obviated in an efficient manner by means of the present invention which is characterized in that an aluminium foil is fed in between a cooled roller and a first nip roller abutting against the cooled roller; that one or more thermoplastic materials in the molten or semi-molten state are extruded in the form of a continuous first film in between the cooled roller and the first nip roller in such a manner that the extruded first film is accommodated between the aluminium foil and the cooled roller, the thermoplastic material being, by cooling, stabilised and solidified at the same time as it is caused to adhere to the aluminium foil for the formation of a plastic-aluminium foil laminate; that this plastic-aluminium foil laminate is, under abutment against the cooled roller, led in under a second nip roller over which the webs of paper or board prepared with punched holes, apertures or slits are led and by means of which these webs are urged against the plastic-aluminium foil laminate passed over the cooled roller; that one or more thermoplastic materials in the molten or semi-molten state are extruded in the form of a continuous, second film in between the cooled roller and the second nip roller in such a manner that the extruded second film is accommodated between the aluminium foil side of the plastic-aluminium foil laminate and the paper or board web, the molten thermoplastic material in the second thermoplastic film being caused, by cooling, to stabilise and solidify at the same time as it is caused to adhere to both the aluminium foil side of the plastic-aluminium foil laminate and the paper or board web.

BRIEF DESCRIPTION OF THE ACCOMPANYING DRAWINGS

A number of embodiments of the present invention will now be described in greater detail hereinbelow, with particular reference to the accompanying schematic figures, in which.

DESCRIPTION OF PREFERRED EMBODIMENTS

Figure 1:
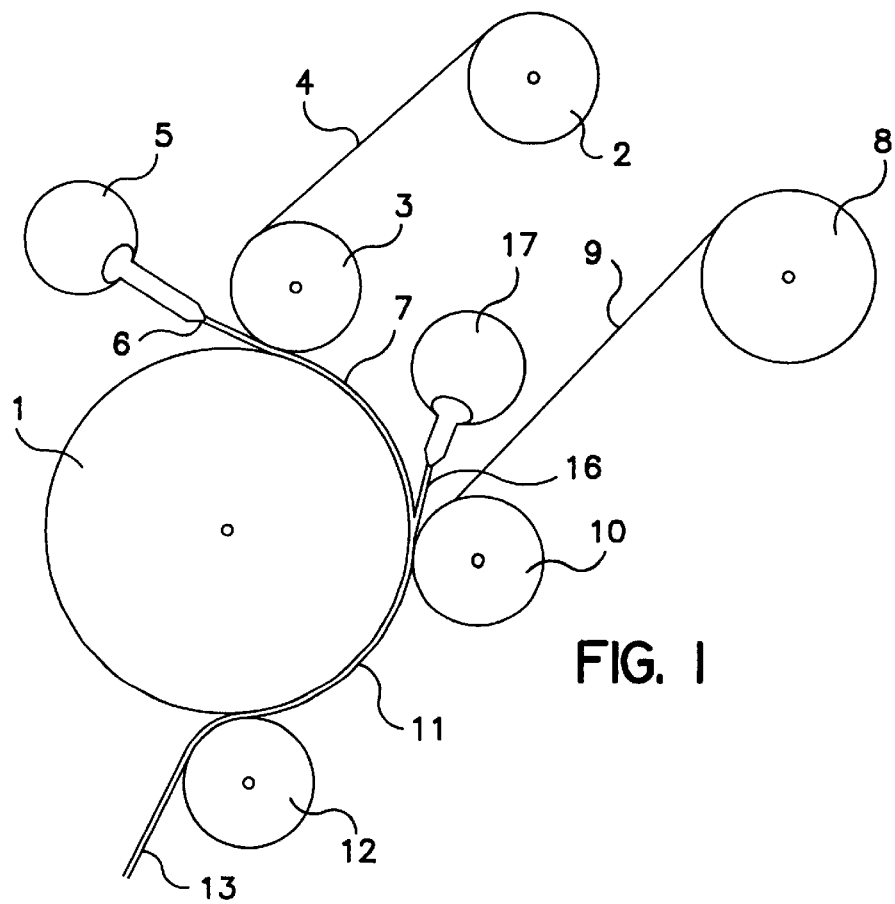
FIG. 1 illustrates the principle of the production method according to the present invention.

The apparatus schematically illustrated in FIG. 1 displays a cooling roller 1 which has nip rollers 3 and 10 cooperating with the cooling roller 1. In addition, the Figure shows a magazine reel 2 for aluminium foil from which an aluminium foil web 4 can be paid out, and a magazine reel 8 holding a core layer web 9 of paper or board, the web 9 having, by a punching operation, been provided with pre-applied holes or apertures 14. FIG. 1 further shows two extruders 5 and 17 by means of which thermoplastic material can be heated to melting point and be forced at great pressure through the board-flat nozzles of the extruders 5 and 17 so that a continuous film or a "curtain" of molten or semi-molten plastic film 6 and 16, respectively are continuously positively discharged.

Production of the packaging material proceeds such that the aluminium foil web 4 is paid out from the magazine reel 2 and led over the nip roller 3 in contact with the cooling roller 1 which is in contact with and synchronously rotating with the nip rollers 3 and 10. At the same time, a continuous film 6 of molten or semi-molten thermoplastic material, for example polyethylene, is forced out by means of the extruder 5, this plastic film being directed into the so-called nip, i.e. the point of contact between the nip roller 3 and the cooling roller 1. The molten or semi-molten thermoplastic film 6 will, in such instance, be accommodated between the aluminium foil web 4 and the surface of the cooling roller 1, and contact with the cooling roller entails that the plastic film 6 is cooled to such an extent that it solidifies at the same time as it adheres to the aluminium foil 4 for forming a plastic-aluminium foil laminate 7.

The thus formed laminate 7 is further cooled by abutment against the surface of the cooling roller 1 for a portion of its circumference and is led in between the second nip roller 10 and the surface of the cooling roller 1. From the magazine reel 8, the core layer web 9 of paper or board is paid out and led over the nip roller 10 into contact with the cooling roller 1. With the aid of a second extruder 17, a continuous plastic film 16 is extruded in between the second nip roller 10 and the cooling roller 1, in which event the expelled plastic film 16 of polyethylene will be accommodated between the aluminium foil side of the formed plastic-aluminium foil laminate 7 and the core layer 9. By compression between the second nip roller 10 and the cooling roller 1, the core layer 9 and the laminate 7 are united to form a composite laminate 11 which is led along the surface of the cooling roller 1 until the lamination layer 16 of polyethylene has been completely stabilised and solidified, whereafter the packaging material 13 is removed over a conducting roller 12.

Since the aluminium foil 4 had first been laminated with good adhesion to the plastic layer 6 for forming the laminate 7, no problems will occur as a result of ruptures in the aluminium foil layer 4 in the region around the punched holes, apertures or slits 14 of the core layer 9, since the plastic film 6 which is included in the laminate 7 imparts to the aluminium foil a considerable rigidity and strength so that the aluminium foil layer is not pressed into the holes, apertures or slits 14, nor does it crease around the edges of these holes or apertures, but instead connects with very good adhesion to the surface of the core layer right out to the edges of the core layer 9. After production, the packaging material web 13 can be rolled up onto magazine reels and be employed in the production of packages of the type described above.

Figure 2:
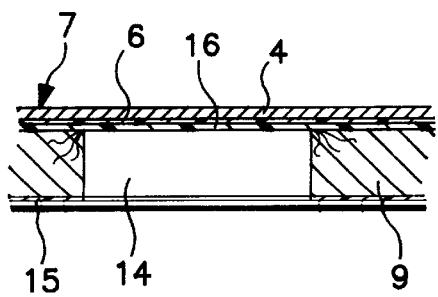
FIG. 2 is, on a much larger scale, a cross section through a packaging material produced in accordance with the present invention.

The greatly magnified cross section through the thus formed packaging material as illustrated in FIG. 2 shows how the laminate 7 produced in the first operation and consisting of the plastic layer 6 and the aluminium foil 4 is, with the aid of the lamination layer 16, secured to the core layer 9 and how the laminate layer 7 bridges over and covers the above-mentioned holes, apertures or slits 14. Advantageously, the core layer 9 may be provided, along its opposing side, with a thin polyethylene layer 15.

Figure 4:
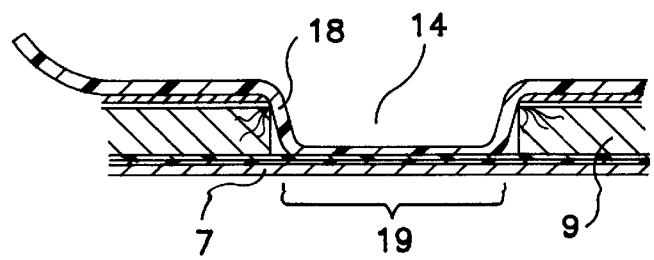
FIG. 4 shows a cross section taken along the line A—A of the aperture illustrated in FIG. 3.
Figure 3:
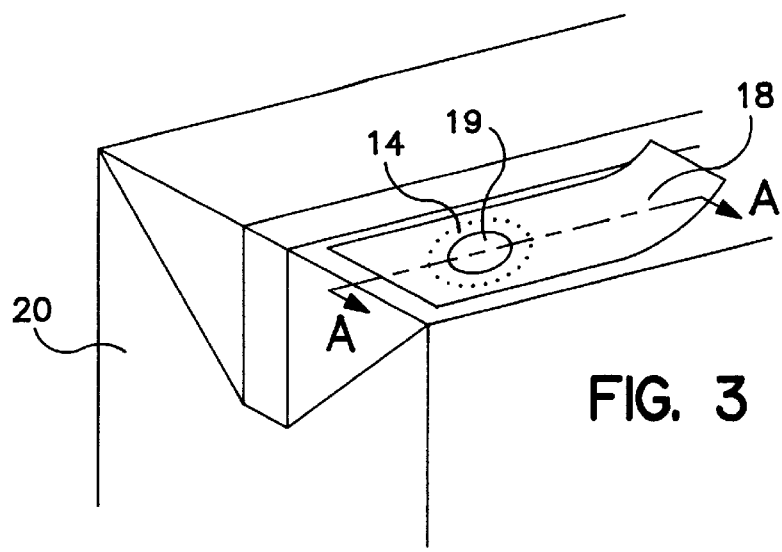
FIG. 3 shows a packaging container produced from the material according to FIG. 2 and provided with a tear strip opening.

The package shown in FIG. 3 is of the type which has been described earlier and fundamentally consists of a parallelepipedic container which has been produced by fold forming and shaping of the packaging material web 13 formed into a tube. As is apparent from FIG. 3, which shows but a part of the package, this consists of a paralellepipedic package body 20 and a punched hole or aperture 14, shown here by broken lines. This hole or aperture 14 is covered by a tear strip or so-called "pull-tab" 18 which fundamentally consists of paper, board or plastic and which, with the aid of heat and pressure, is sealed against parts of the upper side of the package 20 and, in the manner illustrated in FIG. 4, pressed down into the aperture 14 and sealed with good adhesion against the laminate 7 within the portion 19, or more correctly, against that plastic layer 16 which covers the aluminium foil side of the plastic-aluminium foil laminate 7. Given that the plastic-aluminium foil laminate 7 is applied with good adhesion about the edges of the hole or the aperture 14, opening of the package will be facilitated when the pull-tab 18 is removed, since the edge zones of the core layer 9 act as a tear-off edge for the laminate 7. In those cases when a crease formation of the aluminium foil layer has been made around the aperture 14 (which commonly happens when prior art technology is employed), adhesion around the edge zone of the aperture 14 is poor, which implies that an upwardly directed force against the laminate 7 as realized with the aid of the pull-tab 18 will not result in the laminate 7 being torn up, but instead the plastic portion 6 of the laminate is stretched and further delamination between the laminate 7 and the edge zone around the aperture 14 occurs.

Figure 5:
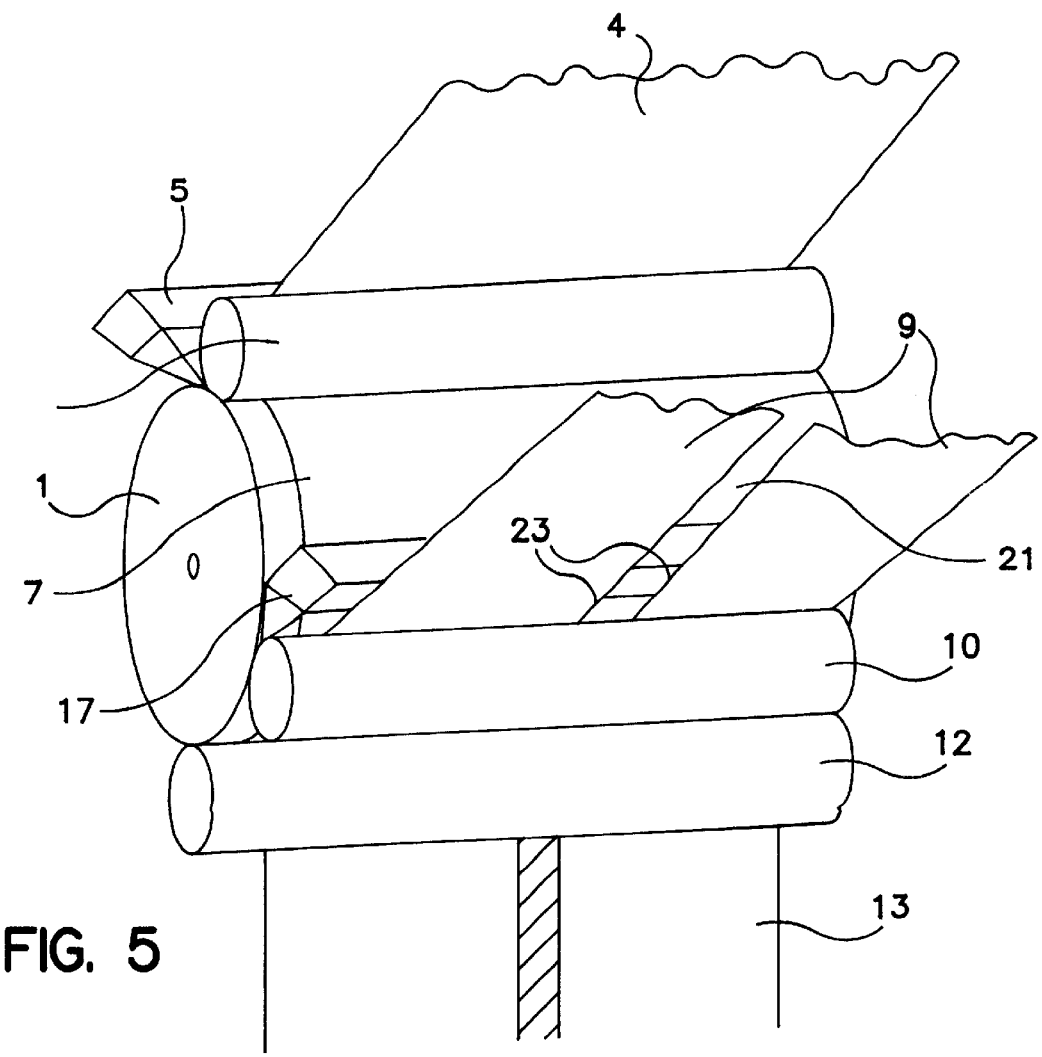
FIG. 5 shows coating of the slit between two webs with a view to creating means for sealingly bridging the liquid-absorbing edge zones of the rear edges.

FIG. 5 shows how it is possible, applying the present invention, to create strips of aluminium foil and plastic material projecting from the edges of the core layer 9 for the purpose, on package formation, of sealingly bridging edge zones 23 of the core layer material 9 exposed to the interior of the package. The manufacture of material with "built-in edge sealing strips" is known in the art and proceeds such that a web 9 of core layer material is first coated on its one side with a thermoplastic layer, that the web is then cut into part webs 9' which are spread in such a manner that there is formed a gap 21 between the webs 9'. In the manner previously described, the produced aluminium foil-plastic foil laminate 7 is laminated to the part webs 9', the gaps or slits 21 between the webs 9' being bridged by the laminate 7.

Since the laminate 7 is produced with good adhesion between the laminate layers, it is of minor consequence that the compression pressure from the nip roller 10 is poor in the gap region 21. If, on the other hand, the aluminium foil layer 4 and the plastic layer 6 were to be united with the aid of the nip roller 10, the result would be poor adhesion.

After the coating operation, the webs 9' are separated by cutting, either in the gap zone 21 or adjacent the edge of the one core layer web 9'. One of two methods may be employed for sealing the incision edges 23 of the webs 9'. Either the edge zones of one web 9, can be united in an overlap joint or seam and heat-sealed to one another in the joint region, or the projecting edge portion of the laminate 7 is first folded around the edge 23 of the core layer 9', whereafter the both edges of the web 9' are joined in an overlap joint or seam.

Thus, with the aid of the present invention, it has proved possible, in a simple manner, to solve a problem which had previously resulted in packages which were not gas-tight, in packages which defied easy opening, and in packages with unacceptable joint seams. This solution implies technically that the production operation of the packaging material may be carried out in a simple and economical manner.

The present invention should not be considered as restricted to that described above and shown on the figures, many modifications being possible without departing from the spirit and scope of the appended claims.

What is claimed is:

1. A method of producing packaging material, comprising the steps of:
   applying a first film of plastic material on a first surface of a metal foil to form a first laminate; and
   securing a second surface of the metal foil web of the first laminate adjacent a first surface of a core layer with a second film of binder material, the core layer being formed with an opening in the form of a hole.

2. The method as set forth in claim 1, comprising the further step of feeding the first laminate into a nip between a cooled roller and a nip roller.

3. The method as set forth in claim 2, wherein the second surface of the metal foil web of the first laminate is secured adjacent the first surface of the core layer with the second film of binder material by feeding the first laminate, the second film, and the core layer into a nip between the cooled roller and a second nip roller.

4. The method as set forth in claim 1, wherein the second surface of the metal foil web of the first laminate is secured adjacent the first surface of the core layer with the second film of binder material by feeding the first laminate, the second film, and the core layer into a nip between a cooled roller and a nip roller.

5. The method as set forth in claim 1, comprising the further steps of, prior to securing the first laminate to the core layer, providing one or more longitudinal slits in a web of the core layer to form two or more core layer webs, separating the two or more core layer webs to define one or more gaps between longitudinal edges of the two or more core, layer webs, and securing the first laminate to the two or more core layer webs over the one or more gaps.

6. The method as set forth in claim 5, comprising the further steps of providing an incision through a portion of the first laminate over the one or more gaps, folding portions of the first laminate extending over the longitudinal edges of the core layer webs around the longitudinal edges, and securing the second surface of the metal foil web of the folded portions of first laminate to plastic material on a second surface of the core layer webs.

7. The method as set forth in claim 6, comprising the further steps of overlapping a first longitudinal edge of a first packaging material web with a longitudinal edge of a second packaging material web.

8. The method as set forth in claim 5, comprising the further steps of providing an incision through a portion of the first laminate over the one or more gaps, and overlapping a first longitudinal edge of a first packaging material web with a longitudinal edge of a second packaging material web.

9. A method of producing packaging material in the form of a web comprising the steps of:
   forming an opening in a paperboard core layer, the opening being in the form of a hole;
   feeding a web of metal foil into a nip between a cooled roller and a first nip roller;
   extruding one or more thermoplastic materials in the molten or semi-molten state in the form of a continuous, first film between the cooled roller and the first nip roller such that the extruded first film is accommodated between the metal foil and the cooled roller;
   cooling the extruded first film against the cooled roller such that it is stabilized and solidified at the same time as it is caused to adhere to the metal foil, thereby forming a plastic-metal foil laminate;
   leading the plastic-metal foil laminate, as it abuts against the cooled roller, between the cooled roller and a second nip roller;
   leading the core layer between the cooled roller and the second roller such that the core layer is urged against the plastic-metal foil laminate;

extruding one or more thermoplastic materials in the molten or semi-molten state in the form of a continuous, second film between the cooled roller and the second nip roller such that the extruded second film is accommodated between a metal foil side of the plastic-metal foil laminate and the core layer; and cooling the extruded second film such that it is stabilized and solidified as it is caused to adhere to both the metal foil side of the plastic-metal foil laminate and to the core layer.

10. The method as claimed in claim 9, wherein the extruded first and second films each include polyethylene.

11. The method as claimed in claim 9, comprising the further step of forming multiple webs of the core layer by providing one or more longitudinal slits in the core layer prior to leading the core layer between the cooled roller and the second roller.

12. The method as claimed in claim 11, comprising the further step of separating the multiple webs laminated to the plastic-metal foil laminate by making longitudinal incisions through the plastic-metal foil layer adjacent the one or more slits.

13. The method as claimed in claim 12, comprising the further step of folding portions of the plastic-metal foil laminate extending over edges of the multiple webs of the core layer around edges of the core layer formed by the slits.

14. The method as claimed in claim 13, comprising the further step of sealing the folded portions of the plastic-aluminum foil laminate against a thermoplastic coating on an opposite side of the core layer webs to form edge zone seals.

* * * * *